(12) United States Patent
Bodin

(10) Patent No.: US 7,209,034 B2
(45) Date of Patent: Apr. 24, 2007

(54) PROVIDING SERVICES WITH RESPECT TO A BUILDING ACCORDING TO THE CONDITION OF THE BUILDING

(75) Inventor: William Kress Bodin, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 703 days.

(21) Appl. No.: 10/418,610

(22) Filed: Apr. 17, 2003

(65) Prior Publication Data

US 2004/0201469 A1    Oct. 14, 2004

(51) Int. Cl.
*G08B 26/00*    (2006.01)
(52) U.S. Cl. .................... 340/505; 340/506; 340/524; 340/525; 340/539.25
(58) Field of Classification Search ............... 340/505, 340/506, 524, 525, 539.25, 3.1
See application file for complete search history.

(56) References Cited

U.S. PATENT DOCUMENTS

| | | | |
|---|---|---|---|
| 5,894,310 A | 4/1999 | Arsenault et al. | 345/433 |
| 7,012,517 B2 * | 3/2006 | Mueller et al. | 340/525 |

2001/0049275 A1    12/2001    Pierry et al.

FOREIGN PATENT DOCUMENTS

| | | |
|---|---|---|
| EP | 0930790 A1 | 7/1999 |
| JP | 05258022 A | 10/1993 |
| JP | 09026984 A | 1/1997 |
| JP | 2001331479 A | 11/2001 |

OTHER PUBLICATIONS

Goto et al.; Proceedings of the 5th International Conference on Computing in Civil and Building Engineering—V—ICCCBE "Knowledge based creation of an architectural 3-D model from 2-D drawings." (E.1. No. EIP93071031099).

* cited by examiner

*Primary Examiner*—Daryl C Pope
(74) *Attorney, Agent, or Firm*—Lizzy Z. Handelsman; John Biggers; Biggers & Ohanian, LLLP

(57) ABSTRACT

Providing services with respect to a building, including depicting a building in a data model, the data model including a three-dimensional representation of the building and a current condition of the building, receiving in a gateway computer, from sensors within the building, data describing the current condition of the building, storing in the data model the data describing the current condition of the building, and tailoring services with respect to the building in dependence upon the current condition of the building.

21 Claims, 3 Drawing Sheets

PROVIDING SERVICES WITH RESPECT TO A BUILDING ACCORDING TO THE CONDITION OF THE BUILDING

BACKGROUND OF THE INVENTION

1. Field of the Invention

The field of the invention is data processing, or, more specifically, methods, systems, and products for providing services for a building according to automated reporting of the current condition of the building.

2. Description of Related Art

Consider a fireman approaching a burning house. The fireman knows only that an alarm was presented from the address of the house. As the fireman approaches, the fireman sees smoke rising from an upstairs window. The fireman does not know what kind of room is behind the window. The fireman does not know the temperature in the room behind the window or in other rooms of the house. The fireman does not know whether smoke is in other rooms of the house.

Consider a police officer approaching a building in which a security alarm has called a security service which in turn called the police. The police officer is the first to arrive on the scene. The police officer does not know whether an intruder is present in the building. If an intruder is in the building, the officer does not know where.

It would be advantageous for providers of services with respect to buildings to be informed of conditions inside buildings, so that services could be tailored in dependence upon actual conditions in buildings.

SUMMARY OF THE INVENTION

Exemplary embodiments of the invention include methods for providing services with respect to a building. Exemplary embodiments include depicting a building in a data model, the data model including a three-dimensional representation of the building and a current condition of the building, and receiving in a gateway computer, from sensors within the building, data describing the current condition of the building. Such embodiments include storing in the data model the data describing the current condition of the building, and tailoring services with respect to the building in dependence upon the current condition of the building.

In exemplary embodiments of the invention, depicting a building in a data model includes describing the building and the current condition of the building in a markup language. In such embodiments, the gateway computer includes an OSGi-compliant gateway computer. In typical embodiments, the gateway computer and the sensors within the building are coupled for data communications on a network supporting one or more data communications protocols, receiving data describing the current condition of the building includes communicating data, between the gateway computer and the sensors within the building, according to at least one data communications protocol.

In exemplary embodiments of the invention, tailoring services includes communicating the data model, including the current condition of the building, from the gateway computer to service providers who provide services with respect to the building. In such embodiments, tailoring services include communicating the data model expressed in a markup language, including the current condition of the building, from the gateway computer to service providers who provide services with respect to the building. Typical embodiments include parsing the data model expressed in a markup language into a display format, and displaying an image of the building represented in the data model including the current condition of the building.

Exemplary embodiments of the invention include repeating in near real time the steps of receiving in a gateway computer, from sensors within the building, data describing the current condition of the building. Such embodiments include storing in the data model the data describing the current condition of the building. Typical embodiments include tailoring services with respect to the building in dependence upon the current condition of the building.

Exemplary embodiments of the invention include methods for providing services with respect to a building. Exemplary embodiments include receiving at a service provider who provides services with respect to the building a data model expressed in a markup language, the data model including a three-dimensional representation of the building and a current condition of the building. Such embodiments include parsing the data model expressed in a markup language into a display format, and displaying an image of the building represented in the data model including the current condition of the building. Typical embodiments include altering the services provided with respect to the building in dependence upon the displayed image.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
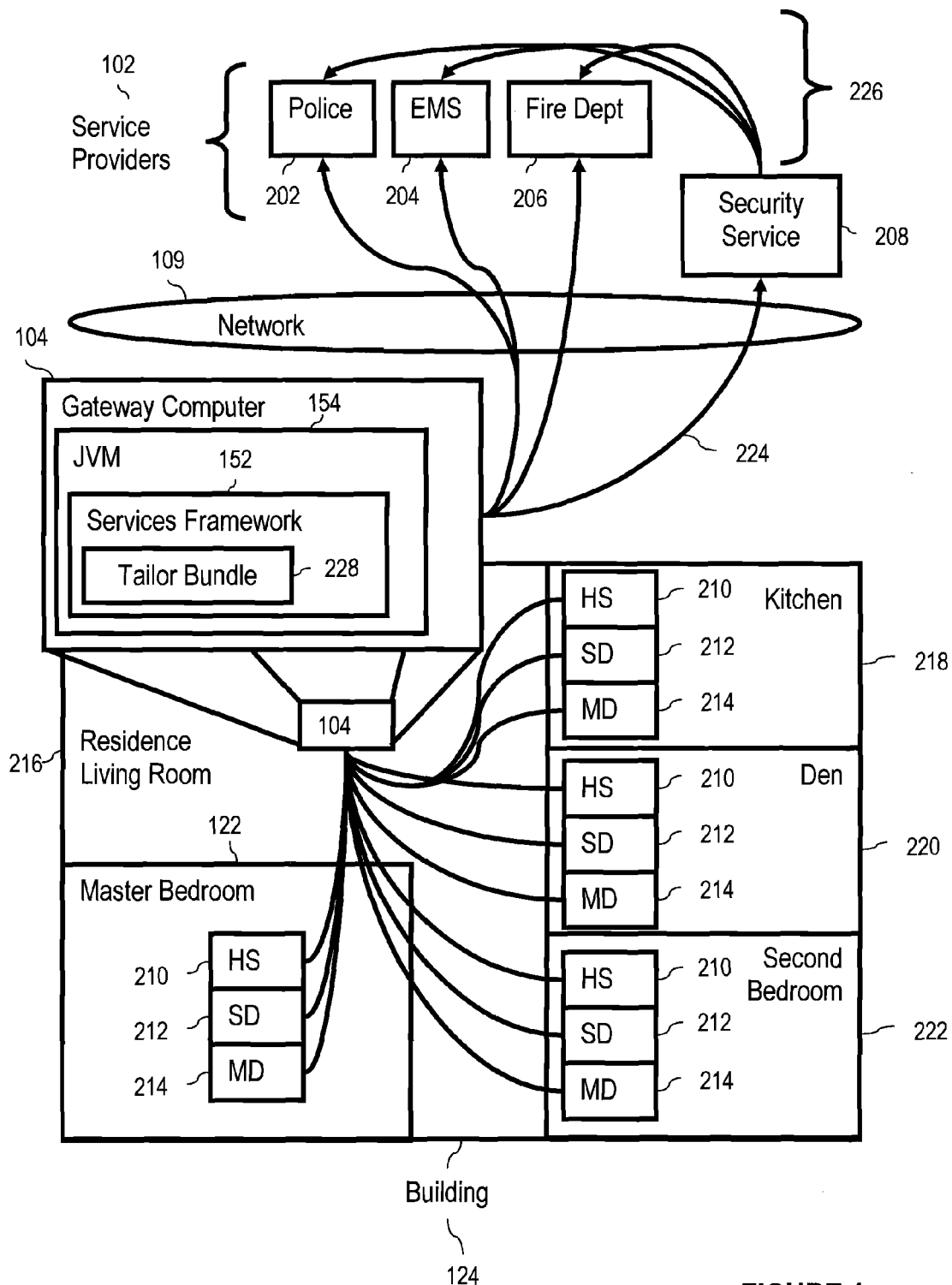
FIG. 1 is a block diagram of exemplary architecture useful in implementing methods for providing services with respect to buildings in accordance with embodiments of the present invention.

The present invention is described to a large extent in this specification in terms of methods for providing services for a building according to automated reporting of the current condition of the building. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"802.11" refers to a family of specifications developed by the IEEE for wireless LAN technology. 802.11 specifies an over-the-air interface between a wireless client and a base station or between two wireless clients.

"API" is an abbreviation for "application programming interface." An API is a set of routines, protocols, and tools for building software applications.

"Bluetooth" refers to an industrial specification for a short-range radio technology for RF couplings among client devices and between client devices and resources on a LAN or other network. An administrative body called the Bluetooth Special Interest Group tests and qualifies devices as Bluetooth compliant. The Bluetooth specification consists of a 'Foundation Core,' which provides design specifications, and a 'Foundation Profile,' which provides interoperability guidelines.

"Coupled for data communications" means any form of data communications, wireless, 802.11b, Bluetooth, infrared, radio, internet protocols, HTTP protocols, email protocols, networked, direct connections, dedicated phone lines, dial-ups, serial connections with RS-232 (EIA 232) or Universal Serial Buses, hard-wired parallel port connections, network connections according to the Power Line Protocol, and other forms of connection for data communications as will occur to those of skill in the art. Couplings for data communications include networked couplings for data communications. Examples of networks useful with various embodiments of the invention include cable networks, intranets, extranets, internets, local area networks, wide area networks, and other network arrangements as will occur to those of skill in the art. The use of any networked coupling among television channels, cable channels, video providers, telecommunications sources, and the like, is well within the scope of the present invention.

"Field"—In this specification, the terms "field" and "data element," unless the context indicates otherwise, generally are used as synonyms, referring to individual elements of digital data. Aggregates of data elements are referred to as "records" or "data structures." Aggregates of records are referred to as "tables" or "files." Aggregates of files or tables are referred to as "databases." Complex data structures that include member methods, functions, or software routines as well as data elements are referred to as "classes." Instances of classes are referred to as "objects" or "class objects."

"HomePlug" stands for The HomePlug Powerline Alliance. HomePlug is a not-for-profit corporation formed to provide a forum for the creation of open specifications for high speed home powerline networking products and services. The HomePlug specification is designed for delivery of Internet communications and multimedia to homes through the home power outlet using powerline networking standards. The HomePlug protocol allows HomePlug-enabled devices to communicate across power lines using Radio Frequency signals (RF). The HomPlug protocol uses Orthogonal Frequency Division Multiplexing (OFDM) to split the RF signal into multiple smaller sub-signals that are then transmitted from one HomPlug enabled-device to another HomePlug-enabled device at different frequencies across the powerline.

"HTTP" stands for 'HyperText Transport Protocol,' the standard data communications protocol of the World Wide Web.

"The Internet" is a global network connecting millions of computers utilizing the 'internet protocol' or 'IP' as the network layer of their networking protocol stacks. The Internet is decentralized by design. Each computer on the Internet is independent. Operators for each computer on the Internet can choose which Internet services to use and which local services to make available to the global Internet community. There are a variety of ways to access the Internet. Many online services, such as America Online, offer access to some Internet services. It is also possible to gain access through a commercial Internet Service Provider (ISP). An "internet" (uncapitalized) is any network using IP as the network layer in its network protocol stack.

"JES" stands for Java Embedded Server. JES is a commercial implementation of OSGi that provides a framework for development, deployment, and installation of applications and services to embedded devices.

"LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network ("WAN"). The Internet is an example of a WAN.

"OSGI" refers to the Open Services Gateway Initiative, an industry organization developing specifications for services gateways, including specifications for delivery of service bundles, software middleware providing compliant data communications and services through services gateways. The Open Services Gateway specification is a Java based application layer framework that gives service providers, network operator device makers, and appliance manufacturer's vendor neutral application and device layer APIs and functions.

"SMF" stands for "Service Management Framework™" available from IBM®. SMF is a commercial implementation of OSGi for management of network delivered applications on services gateways.

"WAP" refers to the Wireless Application Protocol, a protocol for use with handheld wireless devices. Examples of wireless devices useful with WAP include mobile phones, pagers, two-way radios, and hand-held computers. WAP supports many wireless networks, and WAP is supported by many operating systems. Operating systems specifically engineered for handheld devices include PalmOS, EPOC, Windows CE, FLEXOS, OS/9, and JavaOS. WAP devices that use displays and access the Internet run "microbrowsers." The microbrowsers use small file sizes that can accommodate the low memory constraints of handheld devices and the low-bandwidth constraints of wireless networks.

"X-10" refers to the X-10 protocol, a powerline protocol. Typical X-10 enabled devices communicate across AC powerline wiring, such as existing AC wiring in a home, using an X-10 transmitter and an X-10 receiver. The X-10 transmitter and the X-10 receiver use Radio Frequency (RF) signals to exchange digital information. The X-10 transmitter and the X-10 receiver communicate with short RF bursts that encode digital information. In the X-10 protocol, data is sent in data strings called frames. The frame begins with a 4 bit start code designated as "1110." Following the start code, the frame identifies a particular domain, such as house, with a 4 bit "house code," and identifies a device within that domain with a 4 bit "devices code." The frame also includes a command string of 8 bits identifying a particular preset command such as "on," "off," "dim," "bright," "status on," "status off," and "status request."

"XML" stands for 'eXtensible Markup Language,' a language that support user-defined markup including user-defined elements, tags, and attributes. XML's extensibility contrasts with most web-related markup languages, such as HTML, which are not extensible, but which instead use a standard defined set of elements, tags, and attributes. XML's extensibility makes it a good foundation for defining other languages. WML, the Wireless Markup Language, for example, is a markup language based on XML. Modem browsers and other communications clients tend to support markup languages other than HTML, including, for example, XML.

Exemplary Architecture

FIG. 1 is a block diagram of exemplary architecture useful in implementing methods for providing services with respect to buildings in accordance with embodiments of the present invention. In this disclosure, providing services 'with respect to' a building means providing service for the building or for occupants of the building. Firemen, for example, in putting out a fire and helping remove people from a burning building provide both a service to the building itself and also to its occupants.

An exemplary architecture according to FIG. 1 includes a building (124), represented in FIG. 1 as a two-dimensional block diagram of a residence comprising a living room (216), a master bedroom (122), a kitchen (218), a den (220), and a second bedroom (222). The selection of a residence as the exemplary building of FIG. 1 is for convenience of explanation, not for limitation of the invention. Methods and systems for providing services to buildings according to embodiments of the present invention are implemented with respect to any kind of building, office buildings, hospitals, factories, theatres, restaurants, and any others as will occur to those of skill in the art.

The exemplary residence of FIG. 1 includes a gateway computer (104). The exemplary residence of FIG. 1 includes sensors in several rooms, including heat sensors (210), smoke detectors (212), and motion detectors (214). In this example, each sensor is coupled for data communications to the gateway computer which in turn is coupled for data communications to service providers, or, rather, to computer systems of service providers. Service providers are entities who provide services with respect to the building (124). Examples of service providers include Internet service providers, private security services, police departments, emergency medical services, fire departments, and others as will occur to those of skill in the art.

A gateway computer in this example provides data processing for data from the sensors and also provides data communications with service providers (102). In typical embodiments, sensors (210, 212, 214) in a building (124) are coupled for data communications through a LAN to a gateway computer (104). A typical gateway computer is coupled for data communications across a WAN (109) to computers of service providers (102). A gateway computer (104) is a 'gateway' in the sense that it forms a portal through which data from internal sensors are communicated to external service providers. A gateway computer is a 'gateway' in the sense that it is a portal between two forms of data communications, the internal LAN protocols (which are often powerline protocols such as X-10 or wireless LAN protocols such as Bluetooth or 802.11b) and WAN protocols such as for example TCP/IP or HTTP.

The mention in this disclosure of particular protocols is for explanation, not for limitation. There is no limitation of the present invention to any particular protocols; systems providing services according to embodiments of the present invention carry out data communications internally to a building and externally according to any data communications protocol as will occur to those of skill in the art. Although as a practical matter in many embodiments of the present invention, LAN protocols within a building are different from external WAN protocols, that also is not a limitation of the invention. Both LANs and WANs may very well use TCP/IP or HTTP, for example.

In many embodiments of the present invention, the gateway computer (104) comprises an OSGi-compliant gateway computer. While exemplary embodiments of methods for providing services with respect to buildings are described generally in this specification by using OSGi as an example, many other applications and frameworks, will work to implement the methods of providing services with respect to buildings according to the present invention, and are therefore also well within the scope of the present invention. Commercial implementations of OSGi, such as JES and SMF, are also useful in implementing methods of the present invention.

The exemplary architecture of FIG. 1 includes a tailor bundle (228). In many typical embodiments of the architecture of FIG. 1, the tailor bundle (228) is application software useful in implementing methods of providing services with respect to buildings in accordance with the present invention. In fact, an application such as the illustrated tailor bundle typically carries out many of the automated steps of providing services to buildings according to embodiments of the present invention.

In some embodiments of the present invention, an application such as the illustrated tailor bundle is OSGi compliant application software, and is therefore implemented as a service or a group of services packaged as an OSGi 'bundle' installed on an OSGi-compliant services framework (152).

In the exemplary architecture of FIG. 1, the gateway computer (104) includes a services framework (152). The services framework (152) of FIG. 1 is a hosting platform for running OSGi-compliant 'services'. Services are the main building blocks for creating applications according to OSGi. An OSGi services framework (152) is Java software and therefore typically runs on a Java Virtual Machine ("JVM") (154).

In this specification, applications for providing services with respect to buildings are often described in terms of OSGi and Java. The discussion of OSGI and Java in this specification, however, is for explanation and not for limitation. In fact, applications for providing services with respect to buildings according to various embodiments of the present invention can be implemented in any programming language, C, C++, COBOL, FORTRAN, BASIC, and so on, as will occur to those of skill in the art, and applications for providing services with respect to buildings developed in languages other than Java are installed, not only on JVMs, but also upon any operating system or operating environment as will occur to those of skill in the art.

Tailoring Services According to the Current Condition of a Building

Figure 2:
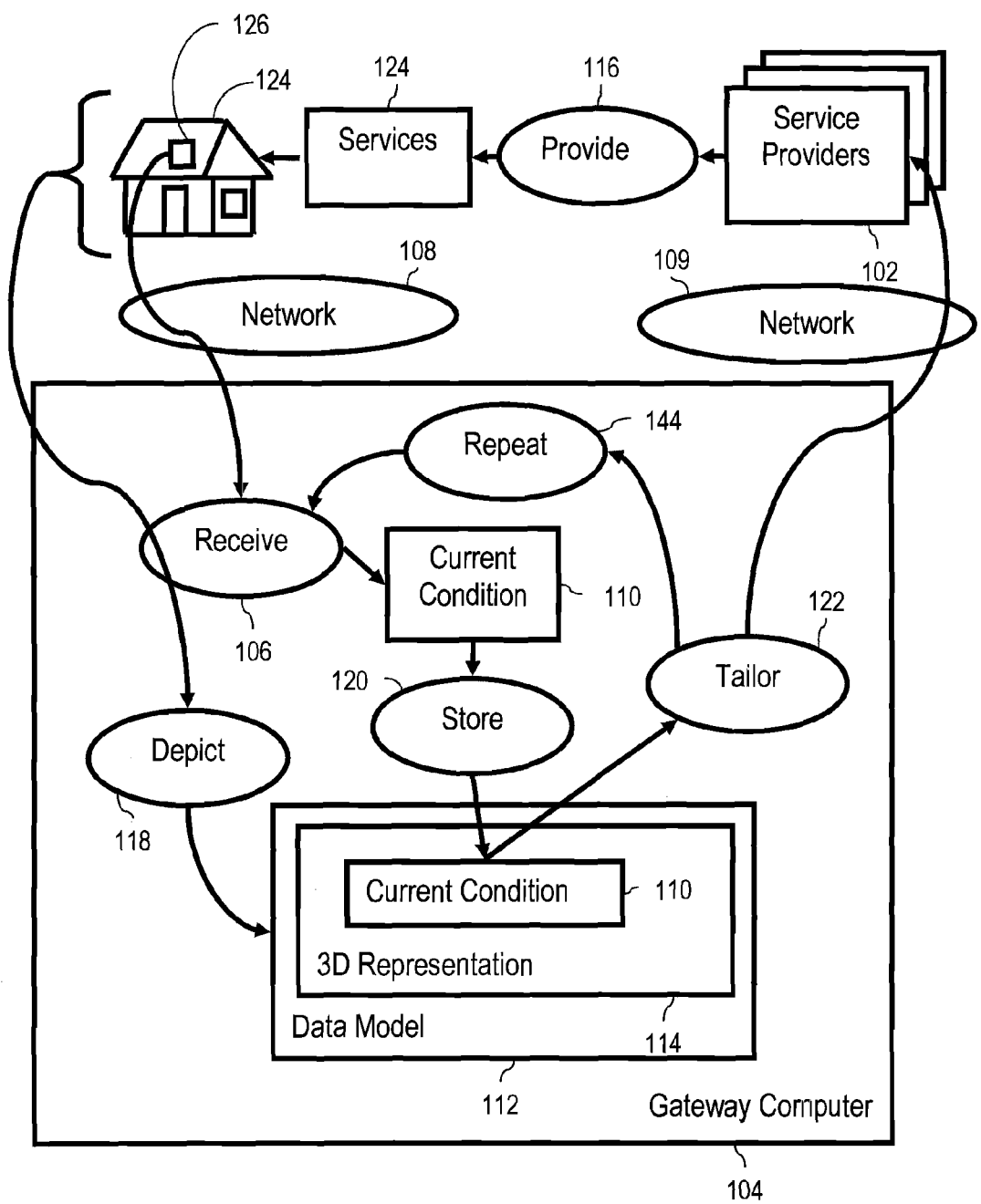
FIG. 2 sets forth a data flow diagram illustrating an exemplary method for providing services with respect to a building.

FIG. 2 sets forth a data flow diagram illustrating an exemplary method for providing services with respect to a building. The method of FIG. 2 includes depicting (118) a building (124) in a data model (112) where the data model comprises a three-dimensional representation (114) of the building and a current condition (110) of the building. Depicting (118) a building (124) in a data model (112) is carried out by use of any automated graphical design tool or computer aided design ("CAD") tool as will occur to those of skill in the art including, for example, the AutoCad™ CAD product from the Autodesk, Inc., of San Rafael, Calif., and the IntelliCAD™ CAD product from CADopia LLC of San Diego, Calif. In many embodiments of the method according to FIG. 2, depicting (118) a building (124) in a data model (112) includes describing the building and the current condition of the building in a markup language. Some versions of automated design tools, including Autocad, for example, provide capabilities for representing descriptions of buildings in markup languages such as XML. Some versions of AutoCad, for example, include an XML schema called DesignXML™ that provides an ability to represent both graphical and nongraphical aspects of a building description.

The example of FIG. 2 includes receiving (106) in a gateway computer (104), from sensors (126) within the building (124), data describing the current condition (110) of the building. In typical embodiments, receiving (106) data describing the current condition (110) of the building is implemented through LAN protocols such as, for example, X-10, Bluetooth, or 802.11b. Data describing the current condition (110) of the building includes any descriptive data that can be electronically encoded and communicated including, for example, temperature, the existence of physical motion in a room, the existence of smoke in a room.

As mentioned above, in many embodiments of the method according to FIG. 2, the gateway computer (104) and the sensors (126) within the building (124) are coupled for data communications on a network (108) supporting one or more data communications protocols Often the network (108) is a LAN. In such embodiments, receiving (106) data describing the current condition (110) of the building (124) typically includes communicating data, between the gateway computer and the sensors within the building, according to at least one data communications protocol, such as, for example, X-10, Bluetooth, 802.11b, or others as will occur to those of skill in the art.

Data describing the current condition (110) of the building includes not only the kinds of conditions that can be measured, but also the condition of equipment within a building. To the extent that a network-enabled security system is installed in a building, for example, data describing the current condition (110) of the building includes data describing whether the security system is on or off, set or reset, enabled or disabled, and so on. To the extent that a network-enabled fire fighting system is installed in a building, for example, data describing the current condition (110) of the building includes data describing whether the fire fighting system is on or off, set or reset, enabled or disabled, and so on. To the extent that a gateway computer is installed in a building, for example, data describing the current condition (110) of the building includes data describing whether the gateway computer is on or off, set or reset, enabled or disabled, and so on.

The method of FIG. 2 includes storing (120) in the data model (112) the data describing the current condition (110) of the building. Data describing the current condition (110) of the building is encoded and stored in any format as will occur to those of skill in the art, including text descriptions, icons representing particular conditions of a building, predefined animations depicting particular conditions of buildings, and even video clips of actual conditions. Some embodiments maintain the data model in the form of a CAD drawing file as provided by AutoCAD or IntelliCAD, for example. Drawing file formats tend to be application-specific, however, so it is believed that many data models according to embodiments of the present invention are maintained in the form of markup files such as for example XML files or SGML files.

Data models can be implemented in XML, for example, as shown in the following example segment of XML.

```
<building id="aResidence">
    <condition id="Security System">Armed</condition>
    <room id="Living Room">
        <condition id="Motion Detector">Negative</condition>
        <wall><condition></condition></wall>
        <wall></wall>
        <floor></floor>
        <ceiling><condition></condition><ceiling>
    </room>
    <room id="Bedroom">
        <condition id="Motion Detector">PositiveDetection</condition>
        <wall>
            <condition id="Heat Sensor">73 Degrees
            Fahrenheit</condition>
        </wall>
        <wall></wall>
        <floor><condition></condition></floor>
        <ceiling><ceiling>
    </room>
</building>
```

This example is simplified for purposes of explaining the inclusion of data describing the current condition of a building. This example shows a building identified as "aResidence" simplified by representing only two rooms, a "Living Room" and a "Bedroom," and only a few data describing the current condition of the building. Typical XML data models also include elements describing locations of the walls, ceilings, floors, and other objects in a 3D scene; vertices of walls, ceilings, floors, and other objects; planar and curvilinear surfaces of objects; lighting; shading; backgrounds; textures; and so on, as will occur to those of skill in the art, all absent here in support of clear explanation.

In this example, the building itself in this example has a <condition> element showing the current condition of a "Security System" as "Armed." The <condition> elements in the "Living Room" are empty, but the <condition> element in the "Bedroom" shows a "Motion Detector" indicating that motion has been detected in the bedroom. In one wall of the bedroom, a <condition> element for a "Heat Sensor" indicates a temperature of 73 degrees Fahrenheit. Some elements in this XML segment contain <condition> elements and other do not. The <condition> elements typically are placed only in those other elements representing parts of a building where sensors are located, so that when the XML segment is rendered in a 3D image on a display, the data describing the current condition of a building can be displayed at the location on the image corresponding to the location from which it originated in the building.

The method of FIG. 2 includes tailoring (122) services (124) with respect to the building in dependence upon the current condition of the building. Consider an example illustrated by use of the example XML segment above. In this example, tailoring (122) services (124) includes communicating to the police that the security system is armed (no one should be in the house) and there is a positive motion detection in the bedroom, indicating a possible intruder. A police officer approaches the house holding a PDA having displayed upon it the 3D representation of the house including an indication that a possible intruder is in the bedroom. If the intruder moves from the bedroom to the living room as the officer approaches the house, that fact is displayed on the 3D image of the house visible to the office on the PDA even as the officer exits a patrol car and walks on foot toward the house. In this example, the officer is holding a wirelessly networked PDA coupled for communications to a security service provider through whom the 3D image of the residence, including the condition data, is communicated from the gateway computer in the house.

When the intruder moves from the bedroom to the living room, the data describing the current condition of a building communicated by the gateway computer changes. The motion detector data from the bedroom changes from

```
<condition id="Motion Detector">PositiveDetection</condition>
to
<condition id="Motion Detector">Negative</condition>,
``` and the motion detector data from the living room changes from

```
<condition id="Motion Detector">Negative</condition>
to
<condition id="Motion Detector">PositiveDetection</condition>.
```

These data elements change because the gateway computer receives from the pertinent sensors new data describing their aspects of the current condition of the building, stores it in the data model, and again communicates the data model so updated to pertinent service providers, in this example, the police.

Figure 3:
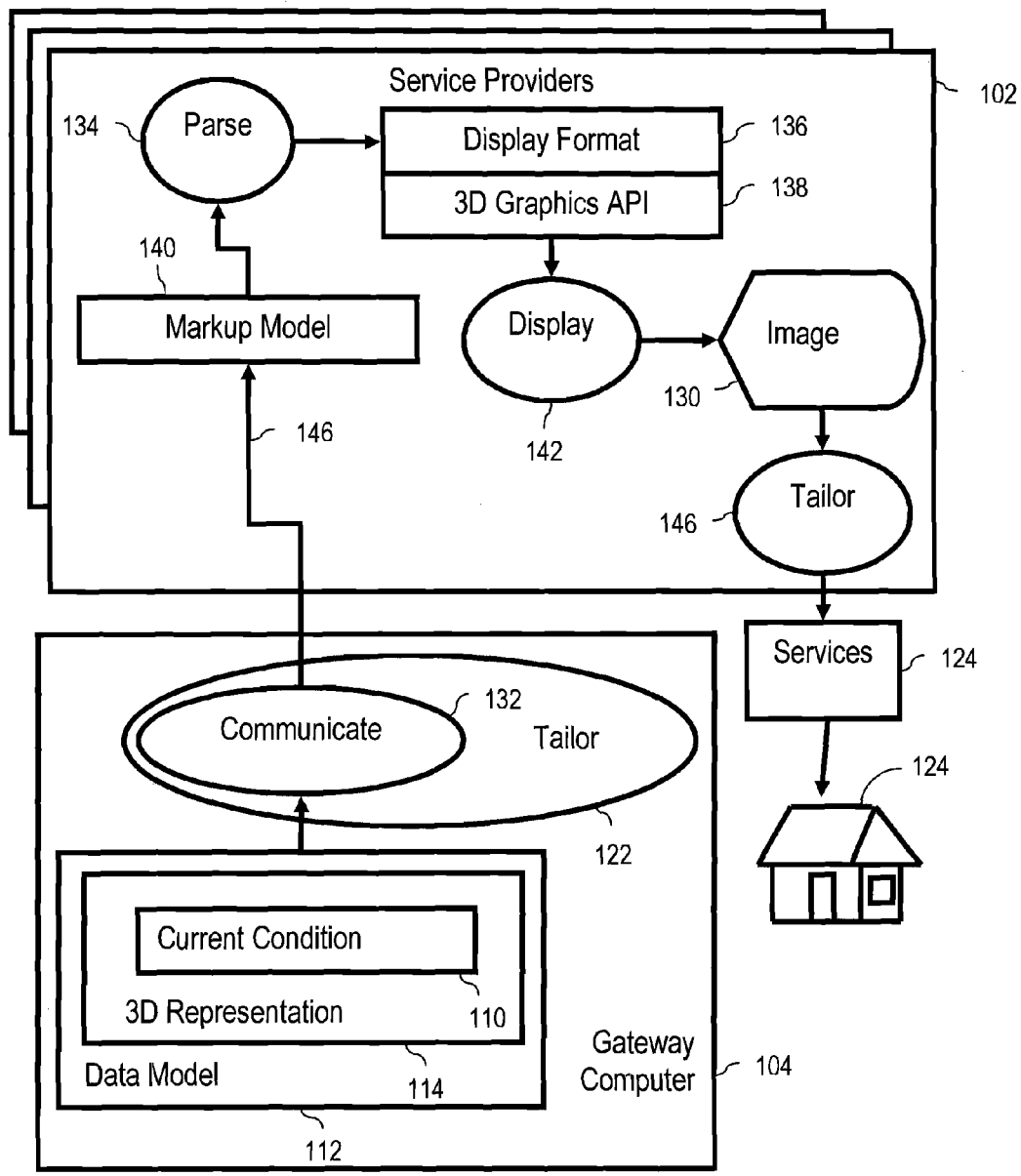
FIG. 3 sets forth a data flow diagram illustrating an additional exemplary method for providing services with respect to a building.

A more detailed explanation of tailoring services is presented with reference to FIG. 3. FIG. 3 sets forth a data flow diagram illustrating an additional exemplary method for providing services with respect to a building. In the method of FIG. 3, tailoring services (122) includes communicating (132) the data model (112), including the current condition of the building (110), from the gateway computer (104) to service providers (102) who provide services (124) with respect to the building. In many embodiments according to the method of FIG. 3, tailoring services (122) further comprises communicating (132) the data model (112) expressed in a markup language (140), including the current condition of the building (110), from the gateway computer (104) to service providers (102) who provide services (124) with respect to the building.

The exemplary architecture of FIG. 1 illustrates two external communications paths for communications of data describing the current condition of a building. In some examples, a gateway computer provides data describing the current condition of a building to an intermediary provider such as a security service or Internet Service Provider ("ISP") (208), and the intermediary forwards the data describing the current condition of a building to pertinent service providers (226). In other exemplary embodiments, the gateway computer itself decides which service provider is pertinent to particular data describing the current condition of a building and communicates directly with the service provider. Continuing the example of XML, a gateway computer can infer from the data model itself which service provider is pertinent to particular data describing the current condition of a building on the basis of XML encoding such as, for example:

```
<condition id="Heat Sensor" contact="Fire Department"> </condition>
<condition id="Security System" contact="Police"> </condition>
<condition id="Motion Detector" contact="Police"> </condition>
```

Methods and systems for providing services with respect to buildings according to the example of FIG. 3 typically also include parsing (134) the data model expressed in a markup language (140) into a display format (136) and displaying (142) an image (130) of the building represented in the data model including the current condition of the building. A display format is client code formatted to display graphic images through a 3D graphics API (138). Display format, client code for 3D APIs, can be expressed in many programming languages including particularly C, Basic, C++, and Java, but also other as will occur to those of skill in the art. Examples of such APIs include those in OpenGL and Java 3D. "OpenGL" is a standard 3D graphics environment, originally developed by Silicon Graphics, Inc., of Mountain View, Calif., now defined by an independent industry consortium called the OpenGL Architecture Review Board. OpenGL provides, among other things, a standard procedural API for use by client code in generating and displaying 3D images. The OpenGL API can be used to create image from pixel data or from geometric vertices. Sun Microsystems, Inc., of Santa Clara, Calif., provides the 3D graphics API called "Java 3D." Although OpenGL is not a Java application as such, Java interfaces for OpenGL are available.

XML parsers are available for parsing XML. One example of an XML parser is "Expat," an open source parser originally developed by Jim Clark of the Thai Open Source Software Center Ltd., Bangkok, Thailand, and now sponsored by the open source development site Open Source Development Network. See www.SourceForge.net and www.expat.sourceforge.net for more details on the Expat XML parser.

Expat is a sophisticated XML parsers. Simpler parsers may be advantageous for some embodiments of the present invention. Particularly in the case of home security and emergency services, small, fast data models with small fast parsers maybe more useful. Some implementers may wish to develop their own parsers, optimizing both the parser and an XML data model to work together for size, speed, and often for a particular 3D API. An example of an XML format designed to work with a particular API is "XGL," an XML format designed particularly for use with OpenGL. XGL is specified by the 'XGL Working Group,' and its specification can be obtained from their website at www.xglspec.org.

FIG. 3 also illustrates a method for providing services with respect to a building that includes receiving (146) at a service provider (102) who provides services (124) with respect to the building a data model (112) expressed in a markup language (140), the data model comprising a three-dimensional representation (114) of the building and a current condition (110) of the building; parsing (134) the data model expressed in a markup language (140) into a display format (136); displaying (142) an image (130) of the building represented in the data model including the current condition of the building; and altering the services provided with respect to the building in dependence upon the displayed image. In this example, a service provider, or rather, a service provider's computer receives a data model expressed in a markup language such as, for example, XML. 'Receiving' typically is carried out through a networked coupling for data communications over, for example, TCP/IP or HTTP, and parsing (134) and displaying (142) are carried out on a security provider computer. Turning again to FIG. 2, it is useful to note for purposes of understanding the particular usefulness of various embodiments of the present invention, that in many embodiments, the method of FIG. 2 includes repeating (144) in near real time the steps of receiving (106) in a gateway computer, from sensors within the building, data describing the current condition of the building, storing (120) in the data model the data describing the current condition of the building, and tailoring (122) services with respect to the building in dependence upon the current condition of the building. Consider the continuing example from the XML segment above. When the motion detector goes positive in the living room, data indicating that condition is received in a gateway computer, and the gateway computer changes the data describing the condition of that sensor in the data model from <condition id="Motion Detector">Negative</condition>
to
<condition id="Motion Detector">PositiveDetection</condition>.

As a police officer arrives at the residence, a stream of XML data modeling the residence, including the current condition of the house, is downloaded across the Internet from a gateway computer in the house to a handheld device in the police officer's hand where it is parsed and displayed on a display screen on the handheld device. Communicating this new data describing the current condition of the residence to the police officer arriving at the residence tailors police services with respect to the residence by causing the police officer to approach the back door of the residence rather than the front door. When the heat sensor reports that the temperature in the bedroom is now 500 degrees Fahrenheit, data indicating that condition is received in the gateway computer, and the gateway computer changes the data describing the condition of that sensor in the data model from <condition id="Heat Sensor">73 Degrees Fahrenheit</condition>
to
<condition id="Heat Sensor">500 Degrees Fahrenheit</condition>.

Communicating this new data describing the current condition of the residence to a fire department tailors fire department services with respect to the residence by causing the fire department to dispatch a fire truck to the residence. If the sensors and the gateway computer communicate the presence of high temperature only in the bedroom, that tailors the fire department services by directing the firemen to the bedroom specifically.

Repeating (144) the steps of receiving (106) data describing the current condition of the building, storing (120) the data describing the current condition of the building, and tailoring (122) services with respect to the building in dependence upon the current condition of the building is said to occur in 'near real time' in the sense that the gateway computer updates the service provider computers with the latest data describing the condition of the building as soon as the gateway computer receives the data from the sensors. As a police officer approaches as residence containing a possibly dangerous intruder, therefore, the police officer's handheld wireless computer is updated with the current actual position of the intruder in the house as the intruder moves from room to room. As a fire truck approaches a burning house or office building, a 3D image of the building is updated with current data describing the temperature and smoke detection status in each room of the building having electronic thermometers or smoke detectors. In this way therefore services with respect to a building are tailored to respond to current conditions of the building as they change in near real time.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for providing services with respect to a building, the method comprising:

depicting a building in a data model, the data model comprising a three-dimensional representation of the building and a current condition of the building, wherein depicting a building in a data model comprises describing the building and the current condition of the building in a markup language;

receiving in a gateway computer, from sensors within the building, data describing the current condition of the building;

storing in the data model the data describing the current condition of the building; and tailoring services with respect to the building in dependence upon the current condition of the building.

2. The method of claim 1 wherein the gateway computer comprises an OSGi-compliant gateway computer.

3. The method of claim 1 wherein:

the gateway computer and the sensors within the building are coupled for data communications on a network supporting one or more data communications protocols; and receiving data describing the current condition of the building comprises communicating data, between the gateway computer and the sensors within the building, according to at least one data communications protocol.

4. The method of claim 1 wherein tailoring services further comprises communicating the data model, including the current condition of the building, from the gateway computer to service providers who provide services with respect to the building.

5. The method of claim 1 wherein tailoring services further comprises communicating the data model expressed in a markup language, including the current condition of the building, from the gateway computer to service providers who provide services with respect to the building, and the method further comprises:
   parsing the data model expressed in a markup language into a display format; and
   displaying an image of the building represented in the data model including the current condition of the building.

6. The method of claim 1 further comprising repeating in near real time the steps of:
   receiving in a gateway computer, from sensors within the building, data describing the current condition of the building;
   storing in the data model the data describing the current condition of the building; and
   tailoring services with respect to the building in dependence upon the current condition of the building.

7. A method for providing services with respect to a building, the method comprising:
   receiving at a service provider who provides services with respect to the building a data model expressed in a markup language, the data model comprising a three-dimensional representation of the building and a current condition of the building;
   parsing the data model expressed in a markup language into a display format;
   displaying an image of the building represented in the data model including the current condition of the building; and
   altering the services provided with respect to the building in dependence upon the displayed image.

8. A system for providing services with respect to a building, the system comprising:
   means for depicting a building in a data model, the data model comprising a three-dimensional representation of the building and a current condition of the building, wherein means for depicting a building in a data model comprises means for describing the building and the current condition of the building in a markup language;
   means for receiving in a gateway computer, from sensors within the building, data describing the current condition of the building;
   means for storing in the data model the data describing the current condition of the building; and
   means for tailoring services with respect to the building in dependence upon the current condition of the building.

9. The system of claim 8 wherein the gateway computer comprises an OSGi-compliant gateway computer.

10. The system of claim 8 wherein:
   the gateway computer and the sensors within the building are coupled for data communications on a network supporting one or more data communications protocols; and
   means for receiving data describing the current condition of the building comprises means for communicating data, between the gateway computer and the sensors within the building, according to at least one data communications protocol.

11. The system of claim 8 wherein means for tailoring services further comprises means for communicating the data model, including the current condition of the building, from the gateway computer to service providers who provide services with respect to the building.

12. The system of claim 8 wherein means for tailoring services further comprises means for communicating the data model expressed in a markup language, including the current condition of the building, from the gateway computer to service providers who provide services with respect to the building, and the system further comprises:
   means for parsing the data model expressed in a markup language into a display format; and
   means for displaying an image of the building represented in the data model including the current condition of the building.

13. The system of claim 8 further comprising means for repeating in near real time the steps of:
   receiving in a gateway computer, from sensors within the building, data describing the current condition of the building;
   storing in the data model the data describing the current condition of the building; and
   tailoring services with respect to the building in dependence upon the current condition of the building.

14. A system for providing services with respect to a building, the system comprising:
   means for receiving at a service provider who provides services with respect to the building a data model expressed in a markup language, the data model comprising a three-dimensional representation of the building and a current condition of the building;
   means for parsing the data model expressed in a markup language into a display format;
   means for displaying an image of the building represented in the data model including the current condition of the building; and
   means for altering the services provided with respect to the building in dependence upon the displayed image.

15. A computer program product for providing services with respect to a building, the computer program product comprising:
   a recording medium;
   means, recorded on the recording medium, for depicting a building in a data model, the data model comprising a three-dimensional representation of the building and a current condition of the building, wherein means, recorded on the recording medium, for depicting a building in a data model comprises means, recorded on the recording medium, for describing the building and the current condition of the building in a markup language;
   means, recorded on the recording medium, for receiving in a gateway computer, from sensors within the building, data describing the current condition of the building;
   means, recorded on the recording medium, for storing in the data model the data describing the current condition of the building; and
   means, recorded on the recording medium, for tailoring services with respect to the building in dependence upon the current condition of the building.

16. The computer program product of claim 15 wherein the gateway computer comprises an OSGi-compliant gateway computer.

17. The computer program product of claim 15 wherein:
   the gateway computer and the sensors within the building are coupled for data communications on a network supporting one or more data communications protocols; and
   means, recorded on the recording medium, for receiving data describing the current condition of the building comprises means, recorded on the recording medium, for communicating data, between the gateway computer and the sensors within the building, according to at least one data communications protocol.

18. The computer program product of claim 15 wherein means, recorded on the recording medium, for tailoring services further comprises means, recorded on the recording medium, for communicating the data model, including the current condition of the building, from the gateway computer to service providers who provide services with respect to the building.

19. The computer program product of claim 15 wherein means, recorded on the recording medium, for tailoring services further comprises means, recorded on the recording medium, for communicating the data model expressed in a markup language, including the current condition of the building, from the gateway computer to service providers who provide services with respect to the building, and the computer program product further comprises:

means, recorded on the recording medium, for parsing the data model expressed in a markup language into a display format; and means, recorded on the recording medium, for displaying an image of the building represented in the data model including the current condition of the building.

20. The computer program product of claim 15 further comprising means, recorded on the recording medium, for repeating in near real time the steps of:

receiving in a gateway computer, from sensors within the building, data describing the current condition of the building;

storing in the data model the data describing the current condition of the building; and tailoring services with respect to the building in dependence upon the current condition of the building.

21. A computer program product for providing services with respect to a building, the computer program product comprising:

a recording medium;

means, recorded on the recording medium, for receiving at a service provider who provides services with respect to the building a data model expressed in a markup language, the data model comprising a three-dimensional representation of the building and a current condition of the building;

means, recorded on the recording medium, for parsing the data model expressed in a markup language into a display format;

means, recorded on the recording medium, for displaying an image of the building represented in the data model including the current condition of the building; and means, recorded on the recording medium, for altering the services provided with respect to the building in dependence upon the displayed image.

* * * * *